Figure 1:
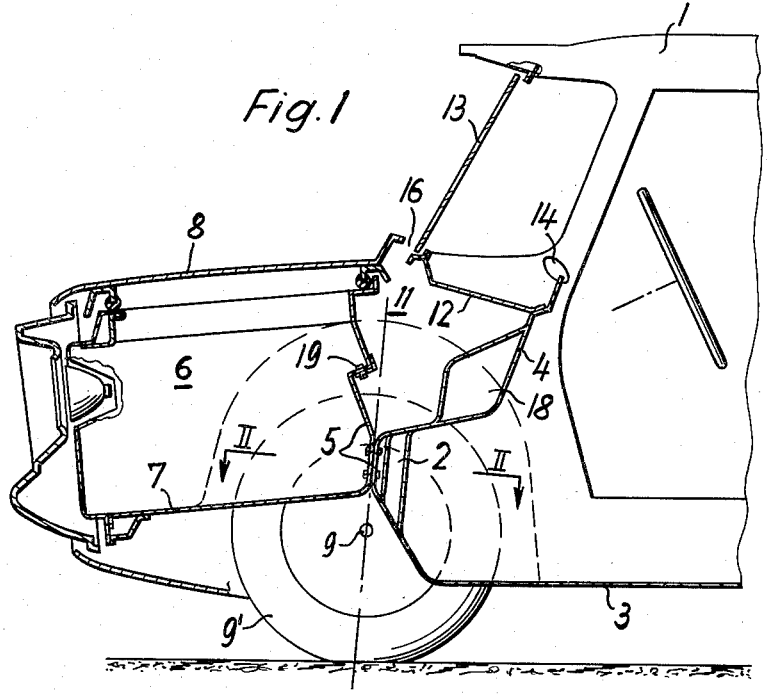

Aug. 29, 1961  B. BARÉNYI  2,998,280
TRANSVERSE REINFORCING STRUCTURE FOR AUTOMOBILES
Filed Aug. 3, 1959

INVENTOR.
BÉLA BARÉNYI
BY
Dickey, Craig and Freudenberg
ATTORNEYS 2,998,280
TRANSVERSE REINFORCING STRUCTURE
FOR AUTOMOBILES
Béla Barényi, Stuttgart-Vaihingen, Germany, assignor to Daimler-Benz Aktiengesellschaft, Stuttgart-Unterturkheim, Germany
Filed Aug. 3, 1959, Ser. No. 831,149
Claims priority, application Germany Aug. 4, 1958
9 Claims. (Cl. 296—28)

The present invention relates to the body structure of an automobile, and especially of a passenger car, and it is an object of the invention to provide certain valuable improvements in such a body structure particularly for reinforcing the same and thus the entire vehicle, and for providing a greater protection of the driver and his passengers, as well as of the instruments on the dashboard.

The essential feature of the invention consists in the fact that the upper part of the floor board of the passenger compartment and the rear end wall of the baggage or engine compartment in the front of the car extend either partly or entirely across the width of the passenger compartment, approach each other and partly or entirely engage with each other within a plane above the front axle, and are secured to each other within the area of their engagement, and that above such area of engagement these two partitions again diverge so as to form a transverse hollow frame which may be used for various purposes and particularly as a solid housing in which various operating elements and instruments of the vehicle, for example, steering elements, wheel suspension elements, engine-control elements and instruments, heating equipment, windshield-wiper motors, and the like, may be mounted, and which may also be used for ventilation purposes and as a trough for collecting and discharging rain water or snow.

Thus, by the particular construction and shape of the floor board and the rear end wall of the engine or baggage compartment in the front of the car, the invention provides a hollow supporting frame which reinforces and solidifies the entire body structure considerably and also serves as a compartment for enclosing and protecting the above-mentioned control and other elements and also as an additional shield or cushion for protecting the driver and his passengers in serious collisions. Due to the fact that this hollow frame is open in the upward direction, the control and other elements mounted therein are easily accessible from above. The protection of these elements within the hollow frame is particularly effective against any impacts upon the front or rear ends of the car in the longitudinal direction thereof.

Another feature of the invention consists in making the two sheet-metal partitions of a flat shape within the area of their connection to each other and in designing them so that this area of connection will be disposed substantially within the same plane in which the front-wheel suspension means are located. A further feature of the invention consists in designing the hollow frame so as to be fully or partly closed at its upper end by a shelflike covering plate mounted underneath the windshield. Between the lower edge of the windshield and the upper end of the frame, the latter may also be provided with an open slot which preferably extends along the entire width of the vehicle.

In order to serve as a trough for collecting and discharging rain water, slush, dirt, insects and the like which impinge upon the windshield and then drop into the hollow frame through the mentioned slot, the frame may be provided at its lowest points with one or more outlets which are preferably slot-shaped and extend in a direction transverse to the longitudinal axis of the car.

These and other objects, features, and advantages of the present invention will become further apparent from the following detailed description thereof, particularly when read with reference to the accompanying drawings, in which—

Figure 2:
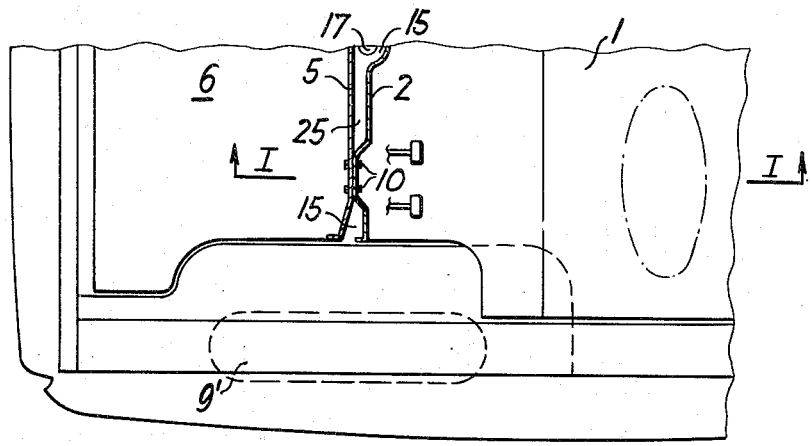

FIGURE 1 shows the front part of a car body in a vertical cross section taken along line I—I of FIGURE 2; while FIGURE 2 shows the same part of the car body as shown in FIGURE 1 in a cross section taken along line II—II of FIGURE 1.

The drawings illustrate, more or less diagrammatically, the front part 1 of a passenger car with a floor board 3 which forms an integral unit together with a pedal supporting plate 2 and the front wall 4 of the passenger compartment. However, the present invention may also be applied to body structures in which the plates 2, 3, and 4 are separate elements. Opposite to pedal plate 2 and forwardly thereof, as seen in the longitudinal direction of the car, the rear end wall 5 of the engine or trunk compartment 6 is mounted which also forms an integral unit together with the bottom plate 7 of this compartment. The rear end wall 5 of compartment 6 extends upwardly to a level closely underneath hood 8. The plate portions 2 and 5 are bent toward each other so as to be in engagement with each other both vertically and transversely for a certain distance 10, as shown in FIGURE 2, at a point above the front axle 9 of wheels 9' and within a plane extending substantially through axle 9. At other parts of plate portions 2 and 5, however, they only approach each other to such an extent as to leave intermediate slots 15 which are open both upwardly and downwardly.

Above this place of engagement 10, plates 2 and 5 again diverge and one of them forms the front wall 4 of the passenger compartment and extends into the dashboard and preferably to the upper end thereof, while the other forms the rear end wall 5 of the engine or trunk compartment 6 and extends to a point closely underneath hood 8. Plates 4 and 5 thus form a hollow supporting frame 11 in which various control and other elements of the car may be mounted, for example, steering elements, wheel suspension elements, engine control instruments and elements, heating elements, windshield wiper motors, and the like. This hollow frame 11 may also serve for ventilation purposes and as a trough for collecting rain water, slush, insects, and the like through a slot 16 between windshield 13 and hood 8 and for discharging the same through slots 15. Frame 11 has a very strong reinforcing effect upon the entire car body, and this effect is increased by the provision of a plate 12 which extends from a point near the bottom of the windshield 13 to the front of the dashboard, thereby covering the upper opening of frame 11 and forming a shelf underneath windshield 13 at the inside of the car. The upper end of the front wall 4 of the passenger compartment may be provided with a bead or beaded element 14 which limits the shelf 12 toward the rear and serves as a protection against injury in the event of a collision. This beaded element 14 may for this purpose consist of a soft resilient material and may also serve as a grip or the like. As indicated in FIGURE 2, one of the slots 15 may also be used as a passage for receiving a part 17 of the steering mechanism.

The front wall 4 of the passenger compartment may serve as the dashboard and may be provided with suitable recesses 18 for receiving the control instruments, a radio, and the like. The opposite wall 5 may be bent at a sharp angle and this angular portion may be braced by an angular support 19 in order to increase the bearing strength, the solidity and rigidity of the hollow frame 11 and thus of the entire body structure.

Although my invention has been illustrated and described with reference to only one preferred embodiment thereof, I wish to have it understood that it is in no way limited to the details of such embodiment or to the particular shape of the hollow frame 11 and the plates 2, 4, and 5, but that it is capable of numerous modifications within the scope of the appended claims.

Having thus fully disclosed my invention, what I claim is:

1. An automobile body structure comprising a first sheet-metal plate means forming a floor board of the driver's compartment, a second plate means forming the bottom of a compartment at the front part of the body, both of said plate means having lateral portions extending toward each other and upwardly projecting portions having complementary regions of engagement with each other at least at some points along the width of said upwardly projecting portions, said upwardly projecting portions diverging above said points of engagement so as to form a hollow supporting frame, at least one operational element of the automobile secured within the protective confines of said hollow frame, and means for securing said plate means to each other at said points of engagement.

2. An automobile body structure as defined in claim 1, further comprising an angularly bent means secured to said first plate means to form a compartment therebetween.

3. An automobile body structure as defined in claim 1, in which said points of engagement of said plates form substantially flat surfaces and are disposed within a plane substantially extending through the front axle of the automobile, the upper parts of said first plate means forming the front wall of the passenger compartment and the upper parts of said second plate means forming the rear wall of said engine or trunk compartment.

4. An automobile body structure as defined in claim 1, further comprising a plate mounted underneath the windshield of the automobile and at least partly covering the open upper end of said hollow frame and adapted to serve as a shelf.

5. An automobile body structure as defined in claim 4, in which the upper end portion of said first plate means projects above said shelf and forms a rear wall thereof.

6. An automobile body structure as defined in claim 4, in which the upper end portion of said first plate projects above said shelf and forms a rear wall thereof, and a rounded part on the upper end of said first plate means and extending substantially along the entire width of the passenger compartment.

7. An automobile body structure as defined in claim 6, in which said rounded part forms a resilient cushion.

8. An automobile body structure as defined in claim 1, in which said second plate means terminates at its upper end at a point adjacent to the hood of said engine or trunk compartment and forms a slot underneath the windshield extending substantially across the entire width of said windshield for the passage of rain water, slush, insects, and the like dropping from said windshield through said slot into said hollow frame, said frame having at least one aperture at its lowest point for discharging said rain water or the like from said frame.

9. An automobile body structure as defined in claim 1, in which said second plate means has an angular steplike portion at a level intermediate its upper end and said points of engagement with said first plate, and an angular bracing member for supporting said steplike portion.

References Cited in the file of this patent

FOREIGN PATENTS 732,875    Great Britain _____ June 29, 1955